United States Patent
Lee et al.

(10) Patent No.: US 7,016,578 B2
(45) Date of Patent: Mar. 21, 2006

(54) INTERIOR OPTICAL CABLE HAVING A PLURALITY OF TIGHT CABLES

(75) Inventors: Ho-Soon Lee, Daegu (KR); Young-Su Jung, Gumi-si (KR); Eun-Song Um, Gumi-si (KR); Joong-Jin Hwang, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 19 days.

(21) Appl. No.: 10/795,900

(22) Filed: Mar. 8, 2004

(65) Prior Publication Data

US 2005/0013564 A1    Jan. 20, 2005

(30) Foreign Application Priority Data

Jul. 14, 2003   (KR)   ............. 10-2003-0047914

(51) Int. Cl.
    *G02B 6/44*    (2006.01)

(52) U.S. Cl. .................................................. 385/104
(58) Field of Classification Search ............. 385/104, 385/101, 103, 105, 106
    See application file for complete search history.

(56) References Cited

U.S. PATENT DOCUMENTS

| | | | | |
|---|---|---|---|---|
| 6,236,789 B1 * | 5/2001 | Fitz | .............................. | 385/101 |
| 6,687,438 B1 * | 2/2004 | Park | ............................ | 385/114 |
| 6,775,444 B1 * | 8/2004 | Hurley | ........................ | 385/104 |
| 6,845,200 B1 * | 1/2005 | Quinn | ......................... | 385/109 |
| 2005/0041941 A1 * | 2/2005 | Lanier et al. | ................ | 385/100 |

* cited by examiner

*Primary Examiner*—Chandrika Prasad
(74) *Attorney, Agent, or Firm*—Cha & Reiter, L.L.C.

(57) ABSTRACT

Disclosed is an interior optical cable including a plurality of tight buffer optical fibers; a subsidiary tension member surrounding the outer circumferences of the optical fibers; and an outer coating layer surrounding the subsidiary tension member, wherein the tight buffer optical fibers has a predetermined lay ratio to the outer coating layer.

11 Claims, 7 Drawing Sheets

INTERIOR OPTICAL CABLE HAVING A PLURALITY OF TIGHT CABLES

CLAIM OF PRIORITY

This application claims priority to an application entitled "INTERIOR OPTICAL CABLE," filed in the Korean Intellectual Property Office on Jul. 14, 2003 and assigned Serial No. 2003-47914, the contents of which are hereby incorporated by reference.

BACKGROUND OF THE INVENTION

1. Field of the Invention

The present invention relates to an interior optical cable, and more particularly to an interior optical cable comprising one or more tight buffer optical fibers.

2. Description of the Related Art

In general, an optical cable comprises one or more optical fibers. Such a fiber is used as a medium for transmitting an optical signal. It is also a basic component of an optical communication network. However, optical fibers, due to their inherent characteristics, are sensitive to the influence of physical and environmental circumferences. Moreover, optical fibers are damaged by variations in external temperature, physical impacts in pavement, tensile forces and the penetration of moisture. This damage, in turn, causes failures in transmitting an optical signal.

In order to solve the above problems, optical fibers are produced in the shape of an optical cable including a central tension member, a filling member, an outer coating member, etc.

FIG. 1 is a cross-sectional view of a conventional interior optical cable including a central tension member. With reference to FIG. 1, the interior optical cable comprises a plurality of sub-unit cables 120, a central tension member 110, subsidiary tension members 130 surrounding tight buffer optical fibers 121 within the sub-unit cables 120, an outer coating member 150, and a rip cord 140.

The central tension member 110 provides tensile strength to the interior optical cable. It is located at the center of the interior optical cable. The central tension member 110 includes a first member 111 made of fiberglass reinforced plastic (FRP), and a second member 112 made of a polymeric material such as polyvinyl chloride (PVC) or polyolefin (PO) for coating the circumference of the first member 111. In this manner, the interior optical cable is prevented from being damaged by variation in the external temperature.

Each of the sub-unit cables 120 includes a plurality of the tight buffer optical fibers 121, the subsidiary tension member 130 surrounding the tight buffer optical fibers 121, and a coating member 122 made of a polymeric material such as PVC and adapted as an outermost layer of the sub-unit cable 120.

Each of the tight buffer optical fibers 121 includes a core (not shown) adapted as a medium for transmitting an optical signal, a clad layer (not shown) surrounding the core, a coating layer (not shown) surrounding the clad layer, and a tight buffer layer (not shown) formed by extrusion molding so as to surround the outer circumference of the coating layer.

In order to improve the tensile strength of the interior optical cable, the subsidiary tension member 130 is located between the tight buffer optical fibers 121 and the coating member 122 within the sub-unit cable 120.

The outer coating member 150 serves as the outermost layer of the interior optical cable. It is formed by extrusion molding.

Consequently, the central tension member 110 prevents the interior optical cable from being damaged due to shrinkage rate differences between the sub-unit cable 120 and the outer coating member 150, when the interior optical cable is contracted due to variations in the external temperature.

However, conventional interior optical cables include a central tension member that has a reduced flexibility and an increased volume, thus being limited in pavement use. In order to solve the above limitations, an interior optical cable that does not include a central tension member has been proposed.

FIG. 2 is a perspective view of the conventional interior optical cable, as described above, which does not include the central tension member. In FIG. 2, the conventional interior optical cable comprises a plurality of tight buffer optical cables 210, a subsidiary tension member 220 surrounding the tight buffer optical cables 210, and an outer coating member 230 formed by extrusion molding so as to surround the outer circumference of the subsidiary tension member 220.

FIG. 3 is a cross-sectional view of the tight buffer optical fiber 210 shown in FIG. 2. In FIG. 3, the tight buffer optical fiber 210 includes a core 211 adapted as a medium for transmitting an optical signal, a clad layer 212 surrounding the outer circumference of the core 211, a coating layer 213 surrounding the outer circumference of the clad layer 212, and a tight buffer layer 214 surrounding the outer circumference of the coating layer 213. The tight buffer optical fiber 210 includes the tight buffer layer 214 obtained by coating the outer circumference of the coating layer 213 with a polymeric plastic. Thus, the tight buffer optical fiber 210 is generally adapted to the interior optical cable without the central tension member.

However, the structure of such an interior optical cable without the central tension member is damaged by the variation in the external temperature such as a low or high temperature. Consequently, the physical and optical characteristics of the interior optical cable are deteriorated.

In order to solve the above-described problem, (i.e., the damage to the structure of the interior optical cable by low temperatures) the interior optical cable comprises a tight buffer optical fiber. The tight buffer optical fiber includes a tight buffer layer with a multi-layered structure made of different materials, or a clad layer coated in a thickness larger than that of the conventional optical fiber.

For example, a tight buffer optical fiber including two tight buffer layers includes (1) a coating layer formed with a thickness of 250 $\mu$m so as to surround the outer circumference of the clad layer, (2) a first tight buffer layer made of an ultraviolet curing agent with a thickness of 300 to 500 $\mu$m so as to surround the outer circumference of the coating layer, and (3) a second tight buffer layer made of a plastic such as polyolefin, polyethylene, nylon, etc., so as to surround the outer circumference of the first tight buffer layer.

A general tight buffer optical fiber has the coating layer with a diameter of 250 $\mu$m. On the other hand, the tight buffer optical fiber adapted to the interior optical cable without the central tension member has the coating layer with a diameter of more than 250 $\mu$m. Thus, it minimizes the shrinkage due to variation in the external temperature, and the damage due to the shrinkage.

However, when the interior optical cable employs a plurality of the tight buffer layers stacked to have a multi-layered structure or the optical fibers has a great thickness, it causes a number of problems. For example, an increase in both the complexity of the manufacturing process and the production cost of the optical cable. Further, in a conventional interior optical cable without a central tension member, there is a great shrinkage rate difference, between the outer coating layer and the sub-unit cable installed within the outer coating layer, due to variations in external temperature. Moreover, the difference in shrinkage between the outer coating layer and the sub-unit cable due to external temperature variations is referred to as post-shrinkage. The above post-shrinkage increases lay ratio of the tight buffer optical fiber located in the interior optical cable. Thus, it increases optical loss. Generally, in forming the outer coating layer of the interior optical cable, when the outer coating layer is extruded, the outer coating layer is quenched with cooling water at a temperature of less than 30 degrees. This process causes the polymeric material of the outer coating layer to be maintained in an unstable state.

SUMMARY OF THE INVENTION

Therefore, the present invention has been made to reduce or overcome the above problems. One object of the present invention to provide an interior optical cable, which minimizes failures such as increased loss and deterioration of characteristics of tight buffer optical fibers caused by the post-shrinkage of an outer coating layer due to the variation in external temperature. Thus, the present invention prevents the loss of an optical signal and improves the productivity and physical characteristics at low cable temperatures.

In accordance with the principles of the present invention, the above and other objects can be accomplished by the provision of an interior optical cable comprising: a plurality of tight buffer optical fibers; a subsidiary tension member surrounding the outer circumferences of the optical fibers; and an outer coating layer formed by extrusion molding so as to surround the subsidiary tension member, wherein the tight buffer optical fibers has a predetermined lay ratio to the outer coating layer, for example in the range of −0.3 to 0.3%.

BRIEF DESCRIPTION OF THE DRAWINGS

The present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. For the purposes of clarity and simplicity, a detailed description of known functions and configurations incorporated herein will be omitted as it may make the subject matter of the present invention unclear.

Figure 1:
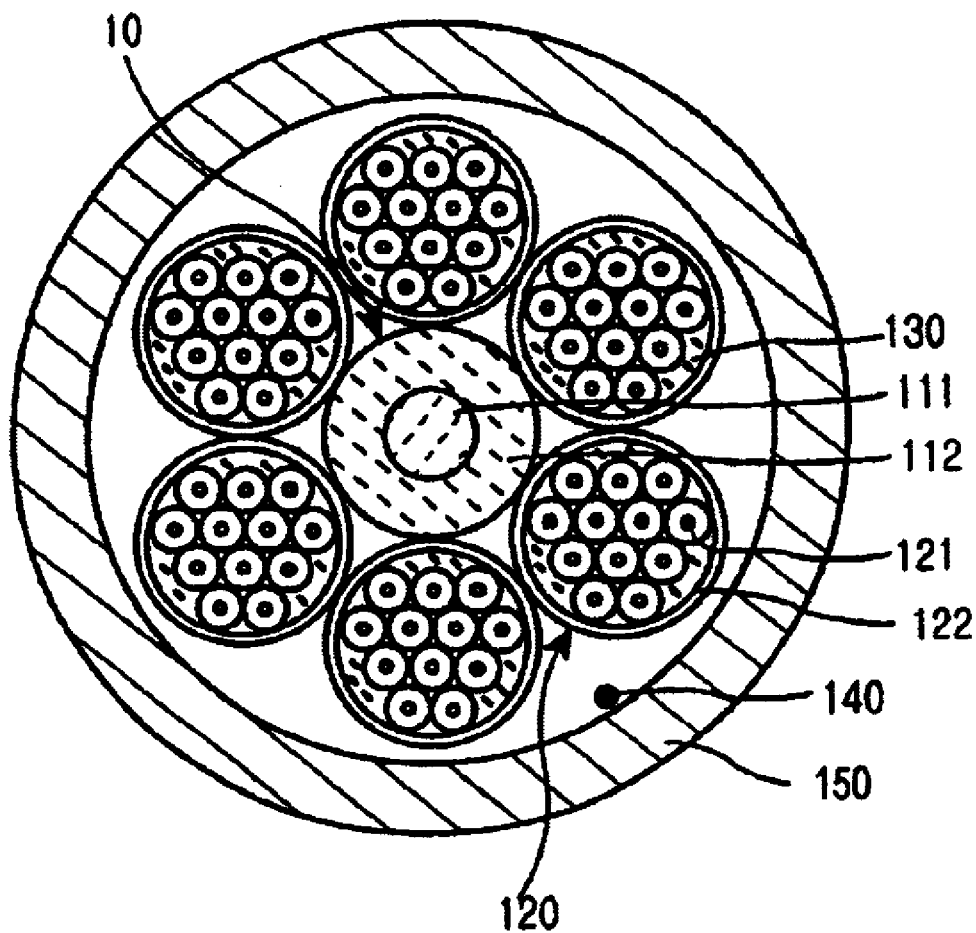
FIG. 1 is a cross-sectional view of a conventional interior optical cable including a central tension member.
Figure 2:
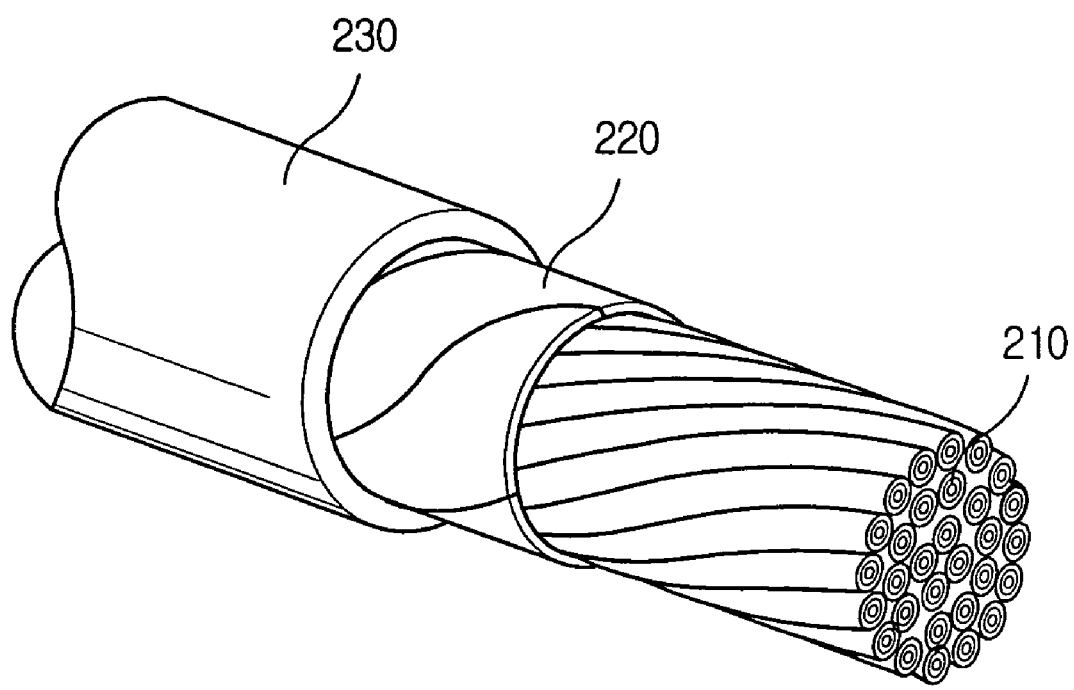
FIG. 2 is a perspective view of a conventional interior optical cable, which does not include a central tension member.
Figure 3:
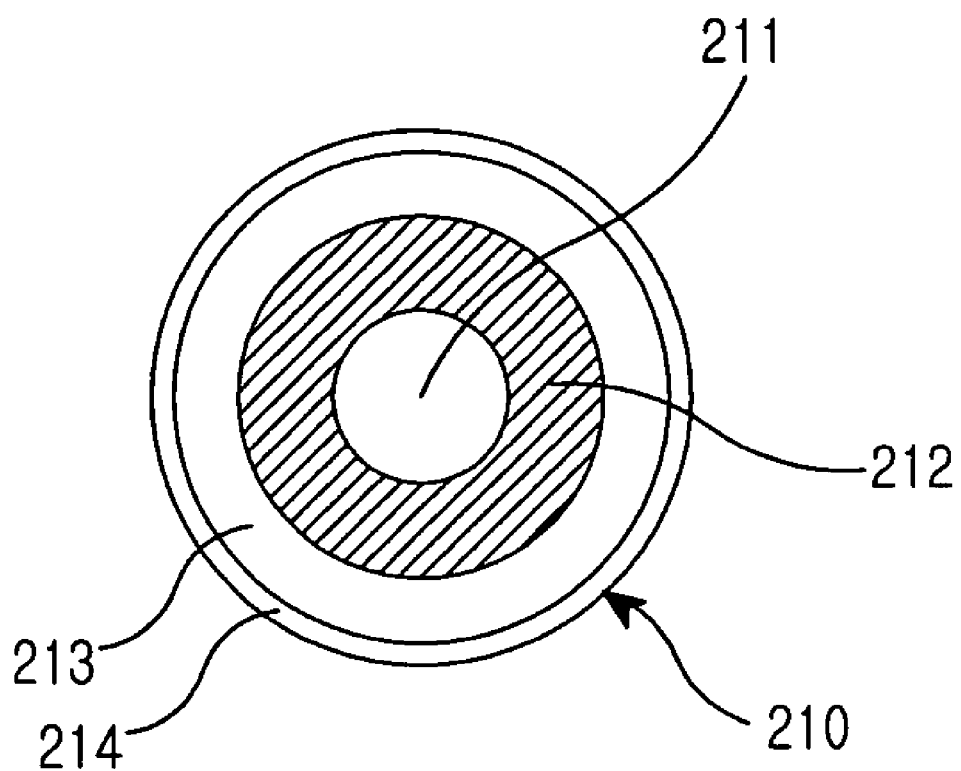
FIG. 3 is a cross-sectional view of a tight buffer optical fiber shown in FIG. 2.
Figure 4:
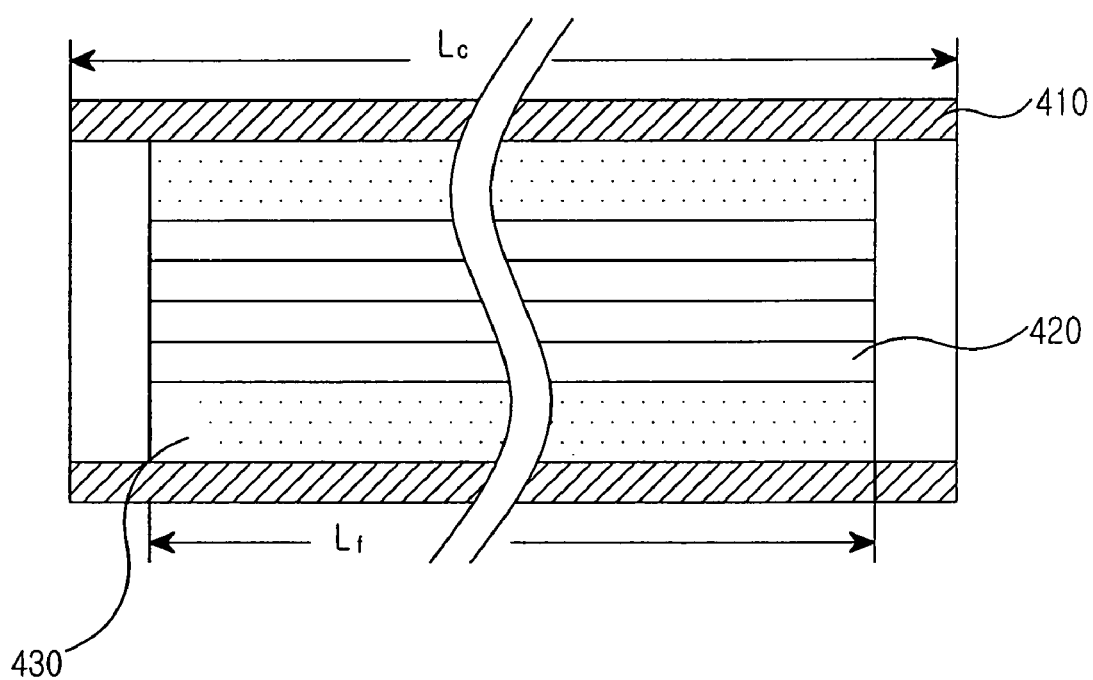
FIG. 4 is a longitudinal-sectional view of an interior optical cable, which does not include a central tension member, in accordance with an embodiment of the present invention.
Figure 5:
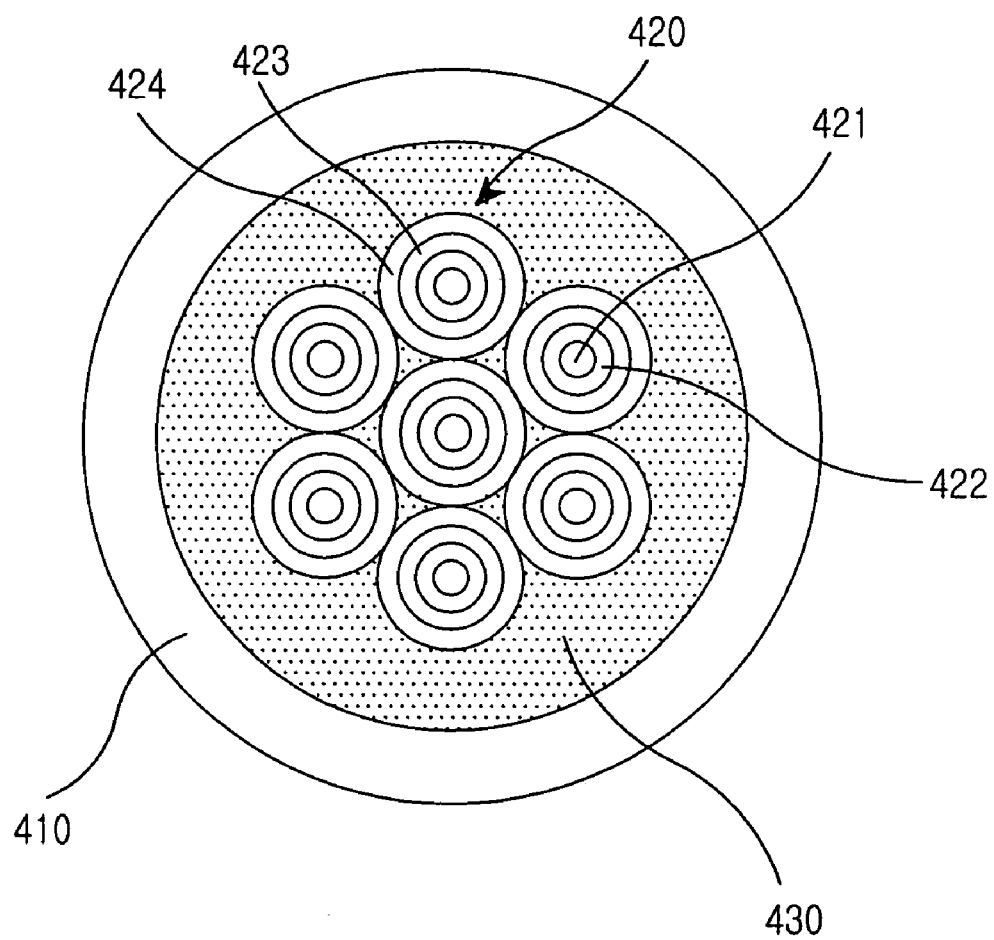
FIG. 5 is a cross-sectional view of the interior optical cable shown in FIG. 4.

FIG. 4 is a longitudinal-sectional view of an interior optical cable, which does not include a central tension member, in accordance with a preferred embodiment of the present invention. FIG. 5 is a cross-sectional view of the interior optical cable shown in FIG. 4. With reference to both FIGS. 4 and 5, the interior optical cable in accordance with the preferred embodiment of the present invention comprises a plurality of tight buffer optical fibers 420, a subsidiary tension member 430, and an outer coating layer 410 formed by extrusion molding so as to surround the outer circumference of the subsidiary tension member 430.

Each of the tight buffer optical fibers 420 includes a core 421 adapted as a medium for transmitting an optical signal, a clad layer 422 surrounding the core 421, a coating layer 423 surrounding the clad layer 422, and a tight coating layer 424 formed by extrusion molding so as to surround the outer circumference of the coating layer 423. The tight buffer optical fiber 420 has a lay ratio to the outer coating layer 410 in the range of −0.3 to 0.3%. Further, the tight buffer optical fibers 420 are twisted into a helical or S-Z structure.

Hereinafter, the lay ratio of the tight buffer optical fiber 420 inserted into the interior optical cable is expressed by the below Equation 1.

$$y = \frac{(x_1 - x_0)}{x_0} \times 100 \qquad \text{[Equation 1]}$$

In the above Equation 1, y denotes the lay ratio (%) of the tight buffer optical fiber 420, $x_1$ denotes the length ($L_f$) of the tight buffer optical fiber 420, and $x_0$ denotes the length (L) of the interior optical cable. More particularly, the above lay ratio is expressed by the ratio of the length ($L_f$) of the tight buffer optical fiber 420 to the length (L) of the interior optical cable. When the lay ratio (%) of the tight buffer optical fiber 420 is not more than 0%, the length ($L_f$) of the tight buffer optical fiber 420 is shorter than the length (L) of the interior optical cable. Conversely, when the lay ratio (%) of the tight buffer optical fiber 420 is more than 0%, the length ($L_f$) of the tight buffer optical fiber 420 is the same as or longer than the length (L) of the interior optical cable.

The tight coating layer 424 is made of polyolefin. A fire retardant, such as aluminum tri-hydroxide (ATH), is added. It also has an oxygen quotient of more than approximately 28%.

The subsidiary tension member 430 is made of a material such as aramid yarn, glass yarn, polyester yarn, and the like. This enables the subsidiary tension member 430 to surround the outer circumferences of the tight buffer optical fibers 420, thereby supporting the tight buffer optical fibers 420.

The outer coating layer 410 is formed by extrusion molding so as to surround the outer circumference of the subsidiary tension member 430. It is made of a polymeric plastic such as PVC, polyethylene, polyolefin, Hytrel, and the like. The outer coating layer 410 serves to bind the subsidiary tension member 430 and the tight buffer optical fibers 420 located therein. Thus, it protects the subsidiary tension member 430 and the tight buffer optical fibers 420 from the external environment.

Figure 6:
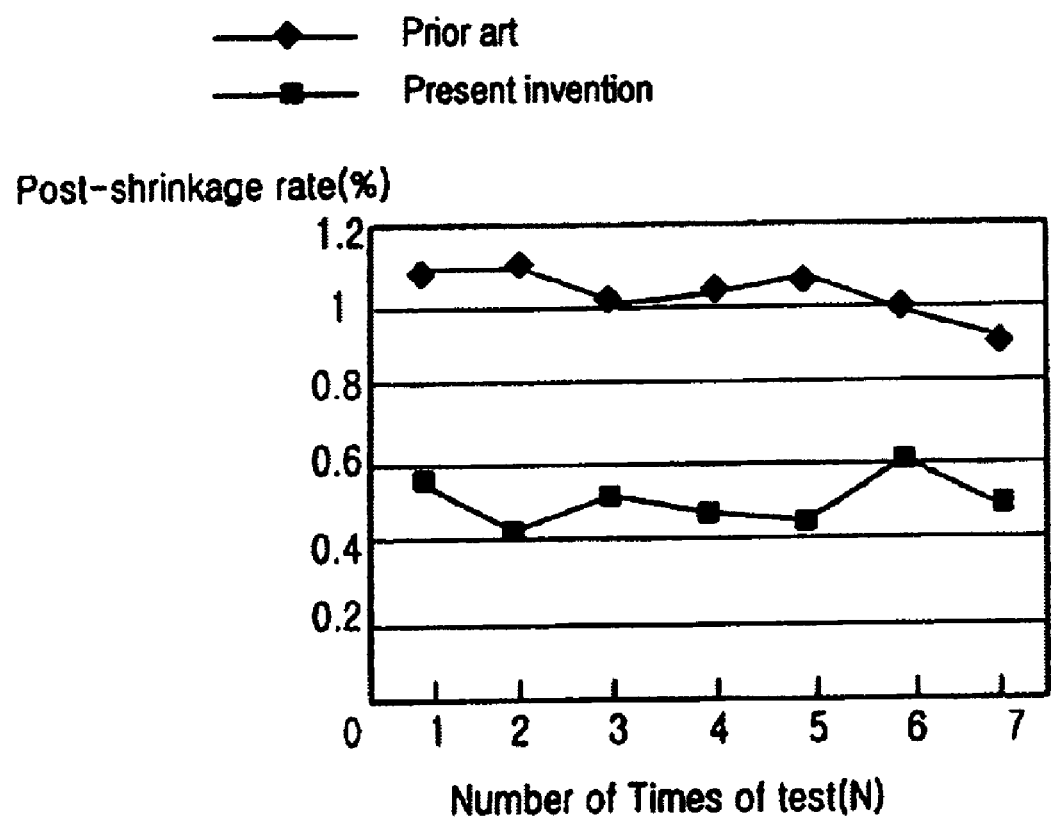
FIG. 6 is a graph comparatively showing post-shrinkage rates of the conventional interior optical cable and the interior optical cable of the present invention, respectively.

FIG. 6 is a graph comparatively showing post-shrinkage rates of the outer coating layers of the conventional interior optical cable and the interior optical cable of the present invention, respectively. The mark (♦) denotes the post-shrinkage rate of the outer coating layer of the interior optical cable of the present invention manufactured such that the tight buffer optical fiber has the lay ratio of −0.3 to 0.3%. The mark (■) denotes the post-shrinkage rate of the outer coating layer of the conventional interior optical cable. The graph of FIG. 6 is obtained by measuring the post-shrinkage rates of the outer coating layers of the interior optical cables, after the interior optical cables are subjected to thermal shock several times due to the variation in external temperature in the range of −45 to 85 degrees, and then returned to room temperature (approximately 23 degrees). The test for measuring the post-shrinkage rates of the outer coating layers of the two interior optical cables shown in FIG. 6 was repeatedly performed seven times.

The term post-shrinkage means the shrinkage of the outer coating layer due to damage to the structure of the polymeric material of the outer coating layer of the interior optical cable, when the interior optical cable is exposed to a high or low temperature condition and then returned to room temperature.

The rate of the variation in the length of the outer coating layer of the interior optical cable due to the above post-shrinkage is referred to as the post-shrinkage rate (%).

Hereinafter, the below Equation 2 expresses the post-shrinkage rate of the outer coating layer of the interior optical cable, which means the degree of shrinkage of the length of the interior optical cable due to the variation in external temperature. The post-shrinkage rate results from the deformation of the structure of the polymeric material of the outer coating layer due to the variation in external temperature.

$$Y = \frac{(L_a - L_b)}{L_b} \times 100 \qquad \text{[Equation 2]}$$

In the above Equation 2, Y denotes the post-shrinkage rate (%) of the outer coating layer of the interior optical cable, $L_a$ denotes the length of the outer coating layer of the interior optical cable before the outer coating layer shrinks due to the variation in the external temperature, and $L_b$ denotes the length of the outer coating layer interior optical cable after the outer coating layer shrinks due to the variation in the external temperature.

With reference to FIG. 6, in the interior optical cable of the present invention, the post-shrinkage rate (■) of the outer coating layer is in the range of 0.4 to 0.6%. In contrast, in the conventional interior optical cable, the post-shrinkage rate (■) of the outer coating layer is in the range of 0.8 to 1.2%.

In order to allow the post-shrinkage rate (■) of the present invention to be in the range of 0.4–0.6%, the outer coating layer of the interior optical cable produced by extrusion molding is gradually annealed. The annealing process includes three steps, at a temperature of 60 to 85 degrees, a temperature of 35 to 50 degrees, and a temperature of 10 to 30 degrees.

Alternatively, the outer coating layer of the interior optical cable may be gradually annealed using two steps at a temperature of 50 to 80 degrees, and a temperature of 20 to 45 degrees.

When the post-shrinkage rate of the outer coating layer of the interior optical cable is more than 1% due to the thermal shock due to the variation in external temperature and the exposure to a low temperature, a single mode optical fiber sustains an optical loss of more than 0.3 dB/km a multi mode optical fiber sustains an optical loss of more than 0.6 dB/km.

Figure 7:
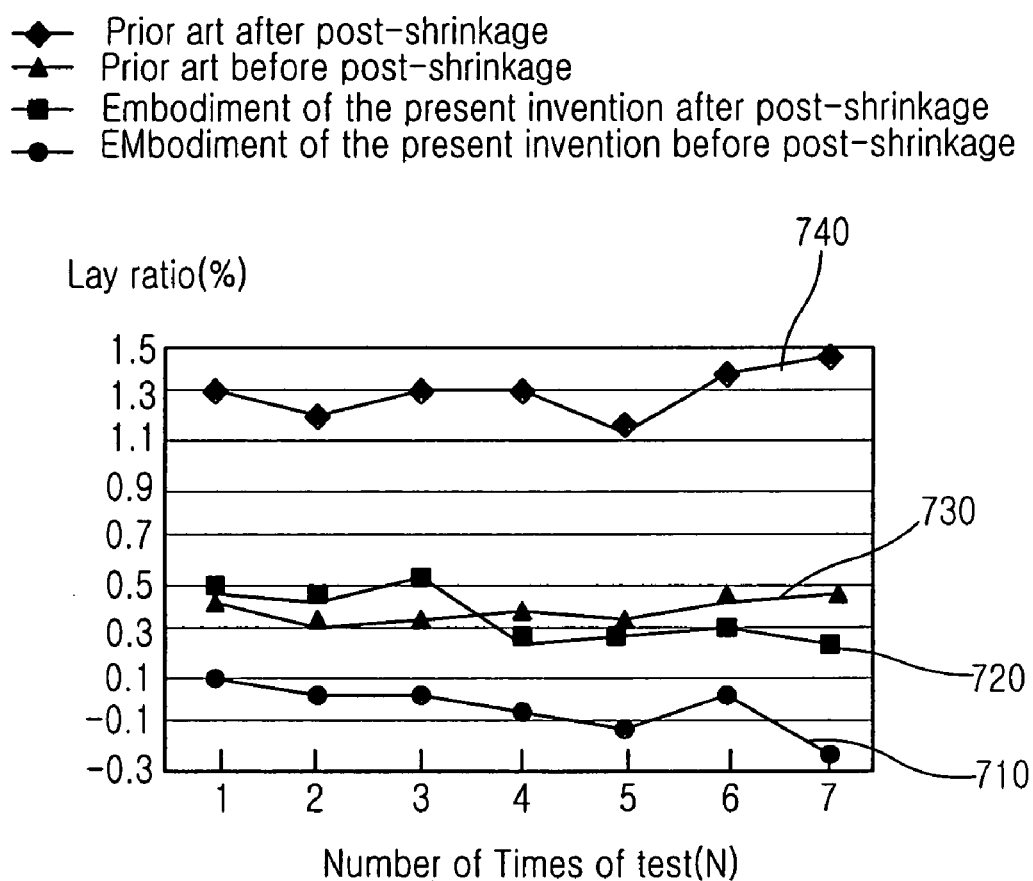
FIG. 7 is a graph comparatively showing lay ratios the conventional interior optical cable and the interior optical cable of the present invention, before and after the generation of post-shrinkage, respectively.

As described above, the post-shrinkage of the outer coating layer serves as a factor for changing the lay ratio of the interior optical cable. FIG. 7 is a graph comparatively showing lay ratios of the conventional interior optical cable and the interior optical cable of the present invention, before and after the generation of post-shrinkage, respectively. The test for obtaining the graphs shown in FIG. 7 was performed under the same condition as that of the test for obtaining the graphs shown in FIG. 6, and was repeatedly performed seven times.

With reference to FIG. 7, in the interior optical cable of the present invention, the lay ratio (●) of the tight buffer optical fiber before the generation of the post-shrinkage of the outer coating layer is in the range of −0.3 to 0.3%, and preferably in the range of −0.3 to 0.1%. Further, the lay ratio (■) of the tight buffer optical fiber after the generation of the post-shrinkage of the outer coating layer is in the range of 0.3 to 0.5%.

However, in the conventional interior optical cable, the lay ratio (▲) of the tight buffer optical fiber before the generation of the post-shrinkage of the outer coating layer is in the range of 0.3 to 0.5%. Further, the lay ratio (♦) of the tight buffer optical fiber after the generation of the post-shrinkage of the outer coating layer due to the variation in the external temperature and the exposure to the low temperature is in the range of 1.1 to 1.5%. That is, the lay ratio of the tight buffer optical fiber of the conventional interior optical cable is increased by more than 1% Thus, it serves as a factor for increasing the post-shrinkage rate of the outer coating layer and the optical loss of the interior optical cable.

In contrast, the lay ratio of the tight buffer optical fiber of the interior optical cable of the present invention, which is in the range of −0.3 to 0.3% before the generation of the post-shrinkage of the outer coating layer, is increased by not more than 0.5% after the generation of the post-shrinkage of the outer coating layer. That is, the interior optical cable of the present invention minimizes the influence of the post-shrinkage of the outer coating layer due to the variation in the temperature and the exposure to the low temperature. This means that the function of the interior optical cable of the present invention is not influenced by the variation in the temperature and the exposure to the low temperature.

As is apparent from the above description, the present invention provides an interior optical cable without a central tension member, in which the lay ratio of tight buffer optical fibers is adjusted. Thus it minimizes the generation of the post-shrinkage of an outer coating layer caused by the variation in external temperature. That is, the interior optical cable of the present invention (1) has a simple structure, (2) prevents the deformation due to the deterioration of its physical characteristics and the variation in the external temperature, and (3) prevents the loss of an optical signal without the application of the central tension member.

Although embodiments of the present invention have been described in detail, those skilled in the art will appreciate that various modifications, additions, and substitutions to the specific elements are possible, without departing from the scope and spirit of the invention as disclosed in the accompanying claims.

What is claimed is:

1. An interior optical cable comprising:
    a plurality of tight buffer optical fibers, which does not include a central strength member in its center;
    a subsidiary tension member surrounding the outer circumferences of the optical fibers; and
    an outer coating layer surrounding the subsidiary tension member,
    wherein the tight buffer optical fibers has a predetermined lay ratio in the range of −0.3 to 0.3% to the outer coating layer.

2. The interior optical cable as set forth in claim 1, wherein the outer coating layer is formed by extrusion molding.

3. The interior optical cable as set forth in claim 1, wherein each of the tight buffer optical fibers includes:
    a core adapted as a medium for transmitting an optical signal;
    a clad layer surrounding the core;
    a coating layer surrounding the clad layer; and
    a tight coating layer formed by extrusion-molding polyolefin so as to surround the outer circumference of the coating layer.

4. The interior optical cable as set forth in claim 1, wherein the tight coating layer is formed by extrusion-molding polyolefin to which a fire retardant is added.

5. The interior optical cable as set forth in claim 4, wherein the fire retardant includes aluminum tri-hydroxide.

6. The interior optical cable as set forth in claim 3, wherein the polyolefin employed as the tight coating layer has an oxygen quotient of more than approximately 28%.

7. The interior optical cable as set forth in claim 1, wherein the tight buffer optical fibers has a lay ratio in the range of 0.2 to 0.5% after the interior optical cable shrinks due to the variation in external temperature.

8. The interior optical cable as set forth in claim 1, wherein the tight buffer optical fibers are twisted to have a S-Z structure.

9. The interior optical cable as set forth in claim 1, wherein the tight buffer optical fibers are twisted to have a helical structure.

10. The interior optical cable as set forth in claim 1, wherein the outer coating layer is made of a polymeric plastic selected from the group consisting of PVC, polyethylene, polyolefin, and Hytrel.

11. The interior optical cable as set forth in claim 1, wherein the outer coating layer has a post-shrinkage rate of not more than 0.7%.

* * * * *